United States Patent
Ostermeyer (10) Patent No.: US 7,287,560 B2
(45) Date of Patent: Oct. 30, 2007

(54) DOOR DEVICE COMPRISING A DOUBLE BAYONET SOCKET FOR AN INSULATOR

(75) Inventor: Thomas Ostermeyer, Biberach (DE)

(73) Assignee: Imbolex GmbH, Attenweiler (DE)

( * ) Notice: Subject to any disclaimer, the term of this patent is extended or adjusted under 35 U.S.C. 154(b) by 0 days.

(21) Appl. No.: 10/552,852

(22) PCT Filed: Nov. 5, 2003

(86) PCT No.: PCT/DE03/03663

§ 371 (c)(1),
(2), (4) Date: Oct. 12, 2005

(87) PCT Pub. No.: WO2004/091868

PCT Pub. Date: Oct. 28, 2004

(65) Prior Publication Data
US 2006/0196573 A1    Sep. 7, 2006

(30) Foreign Application Priority Data
Apr. 12, 2003   (WO) ................ PCT/DE03/01220

(51) Int. Cl.
*B65B 1/04* (2006.01)
(52) U.S. Cl. .................. 141/301; 141/98; 141/386; 414/935
(58) Field of Classification Search ........ 141/383–386, 141/98, 301; 49/62, 114, 279; 414/217, 414/217.1, 935, 292; 220/200
See application file for complete search history.

(56) References Cited

U.S. PATENT DOCUMENTS

| 3,682,208 A | * | 8/1972 | Fedi et al. ............... 141/384 |
| 4,494,586 A | | 1/1985 | Picard |
| 6,655,759 B2 | * | 12/2003 | Sacca ........................ 312/1 |
| 6,779,567 B1 | * | 8/2004 | Szatmary .................. 141/51 |

FOREIGN PATENT DOCUMENTS

| FR | 2 613 526 | 10/1988 |
| WO | WO 03/041087 | 5/2003 |

* cited by examiner

*Primary Examiner*—Steven O. Douglas
(74) *Attorney, Agent, or Firm*—Collard & Roe, P.C.

(57) ABSTRACT

A door fixture to be fastened to a frame of an isolator includes a door and a double bayonet closure with two bayonet locks for reciprocally transferring the isolator from a first state, in which the door, which opens from inside the isolator, is open and detached from the isolator frame and a container flange surrounding a container is sealingly locked to the isolator frame, and a second state, in which the door is shut and sealingly locked to the isolator frame and the container flange is detached from the isolator frame, there being provided a first safety device, which allows the door to be opened only when a container flange of a container is sealingly locked to the isolator frame, and a second safety device, which allows for the removal of the container flange from the isolator frame only when the door is sealingly locked to the isolator frame.

11 Claims, 7 Drawing Sheets

DOOR DEVICE COMPRISING A DOUBLE BAYONET SOCKET FOR AN INSULATOR

CROSS REFERENCE TO RELATED APPLICATIONS

Applicants claim priority under 35 U.S.C. §119 of GERMAN Application No. PCT/DE03/01220 filed on Apr. 12, 2003. Applicants also claim priority under 35 U.S.C. §365 of PCT/DE2003/003663 filed on Nov. 5, 2003. The international application under PCT article 21(2) was not published in English.

BACKGROUND OF THE INVENTION

1. Field of the Invention

The invention relates to a door fixture to be fastened to a frame of an isolator, comprising a door and a double bayonet closure comprising two bayonet locks of different chiralities for the purpose of reciprocally transferring the isolator from a first state, in which the door, which opens from inside the isolator, is open and detached from the isolator frame and a container flange surrounding a container is sealingly locked to the isolator frame, and a second state, in which the door is shut and sealingly locked to the isolator frame and the flange is detached from the isolator frame, there being provided a first safety device, which allows the door to be opened only when a container flange of a container is sealingly locked to the isolator frame, and a second safety device, which allows the removal of the container flange from the isolator frame only when the door is sealingly locked to the isolator frame.

2. The Prior Art

Door fixtures of the kind described above are known in the prior art in a variety of embodiments, all of which function in the same or similar manner. The known isolator doors generally comprise a door fixed to a frame by a hinge, in which case the door contains a bayonet lock which allows an alternating disk that closes the opening of a flange to be securely attached to the door during an opening operation while being detached from the flange by means of a second bayonet lock, which alternating disk is reversibly detachable from the door when it is in the open condition. When the door is closed by manual operation with the aid of protective gloves that reach into the isolator interior, the door is first securely attached to the isolator frame by means of a latch, whereupon a corresponding backward turn of the handles that are fixed to the flange, with the aid of the double bayonet closure, causes, on the one hand, the alternating disk to be simultaneously detached from the door and attached to the flange, and, on the other hand, the flange to be detached from the frame of the door, whereupon the alternating disk is securely re-attached to the flange such that the flange opening is re-closed.

By virtue of the fact that, in the double bayonet of the known door fixtures, the two bayonet locks have different chiralities i.e. one lock is provided with a right-handed thread and the other lock is provided with a left-handed thread, turning the handles attached to the flange will cause the double bayonet to fulfill the double function of attaching the flange to the frame while detaching the alternating disk from the frame and attaching the alternating disk to the door, and accordingly, when the functions are reversed, detaching the flange from the frame while the alternating disk shifts from being attached to the door to being attached to the flange.

However, when the known double bayonet is used on an isolator, two function-dependent crucial weaknesses emerge in connection with the above described functionality, and these must be avoided at all costs. The first relates to a situation of the isolator in which the door must be opened in the absence of a container, and the second relates to a situation of the isolator in which the container must be removed from the frame with the door open.

SUMMARY OF THE INVENTION

It is an object of the invention to provide a door fixture which ensures that the door will not open from inside the isolator when a flange of a container is not in place on the isolator frame and a bayonet of the flange is thus does not engage a corresponding bayonet thread, and to provide an additional safety device that prevents the bayonet of the flange of the container, which is attached to the isolator frame when the door is open, from moving into a position in which the flange is removable from the isolator frame.

For a door fixture as described above, this object is achieved by a releasably lockable locking ring rotatably mounted in the isolator frame, in one end position of which the first safety device is activated and the second safety device is deactivated, and in the other end position of which the first safety device is deactivated and the second safety device is activated.

Preferred embodiments of the invention are subject matter of the subclaims.

The provision in the door fixture of the invention of a releasably lockable locking ring rotatably mounted in the isolator frame, in one end position of which the first safety device is activated and the second safety device is deactivated, and in the other end position of which the first safety device is deactivated and the second safety device is activated, creates a door fixture for an isolator in which a maximum of safety is provided against unwanted contamination of the space surrounding the isolator in all operating situations, owing to the impossibility of either the isolator door being accidentally opened from the inside, or the container flange being accidentally detached from the outside.

According to a first preferred embodiment of the door fixture of the invention, the locking ring is provided with a rotary handle.

According to an important preferred embodiment of the door fixture of the invention, the first safety device contains a first pin which is mounted in the isolator frame such that it can be reciprocally displaced, and, when a container bayonet is turned into the isolator frame, can be moved from a biased home position toward the locking ring, thereby abutting an engagement member, which can be entrained by means of the pin to such an extent that said engagement member comes into alignment with the locking ring such that it is free to turn within the isolator frame from one end position, in which the isolator door is locked tight, to the other end position, in which the door can be opened.

The engagement member can be in the form of a pin, for instance, and a helical spring can be provided for biasing it.

According to another important preferred embodiment of the door fixture of the invention, the second safety device contains a curved and partly helical channel which is provided in the locking ring, and the door, which is provided with lateral rollers, can be inserted into the opening thereof that faces the isolator, there being a second reciprocally displaceable pin mounted in that surface of the channel which is remote from the isolator, which pin abuts a reciprocally displaceable engagement member and is biased such that, due to the action of a door roller caused by insertion thereof into the curved channel and rotation of the locking ring so as to move said roller into its first end position, closing the door, said pin can be moved from its biased home position, in which the engagement member catches in a recess in the container bayonet in order to lock the container bayonet in position, to a displaced position, in which the engagement member releases the bayonet so that it can be turned out and, later, turned back in.

It is advantageous when at least one arresting device for the door is provided on the isolator frame to prevent rotation of the door when the locking ring is turned. Such an arresting device can also be in the form of a pin which catches in a corresponding recess in the region of the periphery of the door of circular cross-section. Preferably two diametrically opposing arresting devices are provided.

According to preferred embodiments, a door is provided with two lateral rollers, whose axes of rotation are aligned in the radial direction of the circular door.

The second pin can be in the form of a screw, and a helical spring can be provided for the purpose of biasing the second pin.

BRIEF DESCRIPTION OF THE DRAWINGS

The door fixture of the invention is described below with reference to an embodiment illustrated in the drawings, in which.

DETAILED DESCRIPTION OF THE DRAWINGS

The embodiment illustrated in FIGS. 1 to 10 of the door fixture 100, 200 of the invention comprises an isolator frame 410 in which an opening 420 is provided, which is releasably closable by a door 100, and further contains a double bayonet closure composed of two bayonet locks 110, 220; 210, 320 showing different chiralities. A closable container 300 is provided with a bayonet 310 which interacts with a bayonet counter bearing 311 formed on the isolator frame 410.

The double bayonet closure consisting of a door bayonet 110 and a door bayonet bearing 220, on the one hand, and a closure unit bayonet 210 and a closure unit bayonet bearing 320, on the other hand, enables the reciprocal transfer of the isolator 400 from a first state, in which the door 100, which opens from the inside of isolator 400, is open and detached from the isolator frame 410 and in which a container bayonet 310 that surrounds an opening 330 of a container 300 is sealingly locked to the isolator frame 410, to a second state, in which the door 100 is closed and sealingly locked to the isolator frame 410 and the container bayonet 310 is detached from the isolator frame 410.

A first safety device 140, which is provided in the isolator frame 410, allows the door 100 to be opened only when a container bayonet 310 of a container 300 is sealingly locked to the isolator frame 410, and a second safety device allows for the removal of the container bayonet 310 from the isolator frame 410 only when the door 100 is sealingly locked to the frame 410.

According to a further essential feature of the invention, the door fixture 100 of the invention contains a locking ring 143 that is rotatably mounted in the frame 410 and can be releasably locked in position, in one end position of which the first safety device 140 is activated and the second safety device 150 is deactivated, and in other end position of which the first safety device 140 is deactivated and the second safety device 150 is activated. The locking ring 143 is provided with a rotary handle 151.

Figure 1:
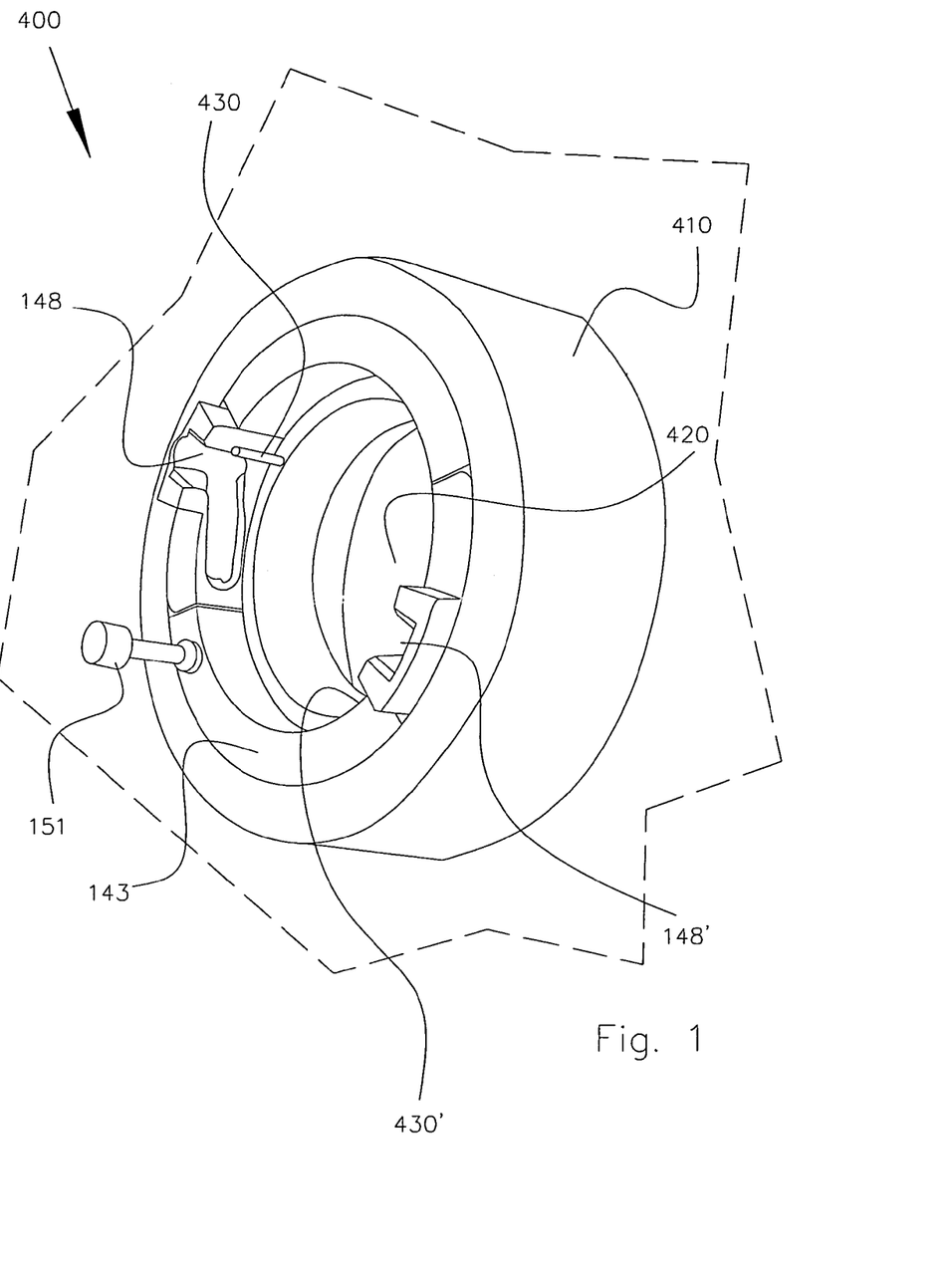
FIG. 1 shows the frame of a preferred embodiment of the door fixture of the invention in an oblique top view from the direction of the isolator.
Figure 2:
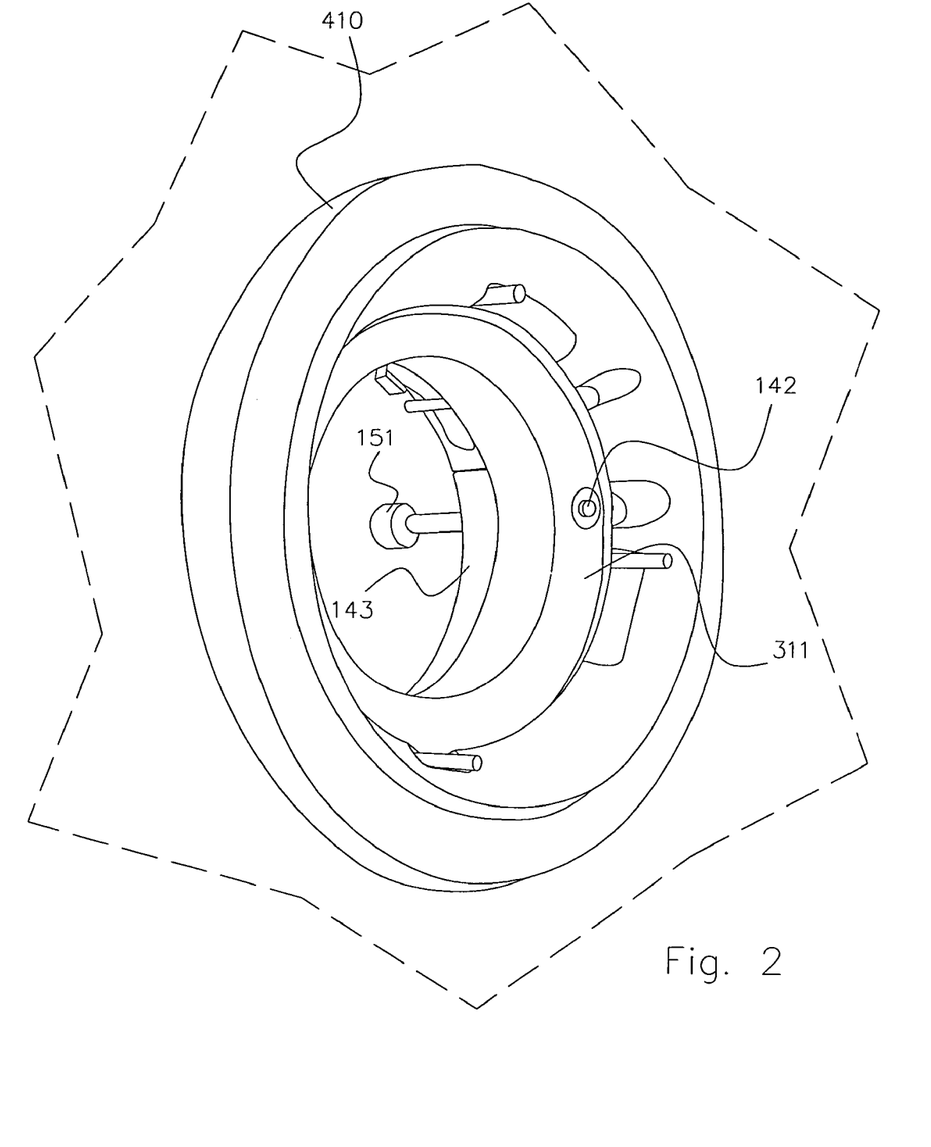
FIG. 2 shows the frame illustrated in FIG. 1 of the preferred embodiment of a door fixture of the invention in an oblique top view from the direction of the container.
Figure 3:
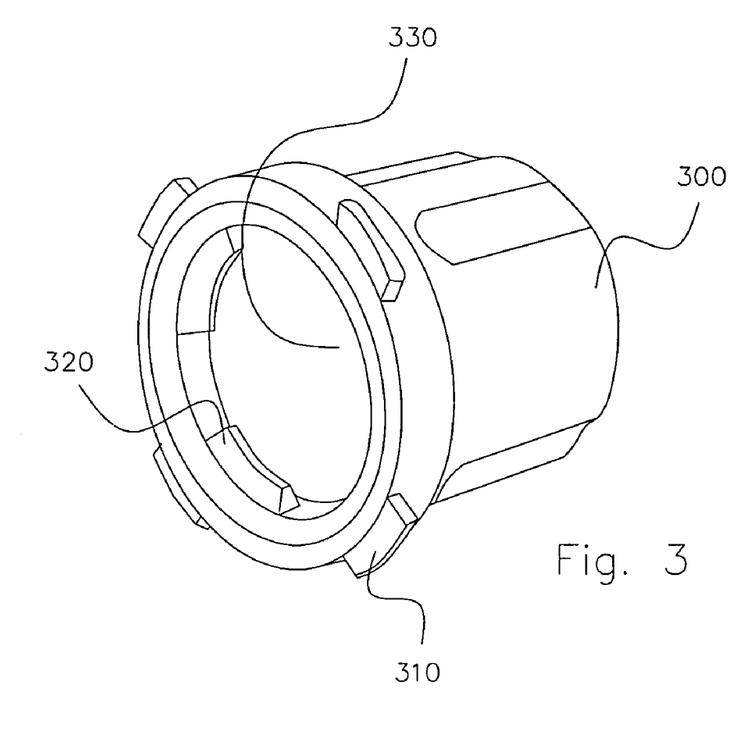
FIG. 3 shows an open container of the preferred embodiment of the door fixture of the invention in an oblique front view.
Figure 4:
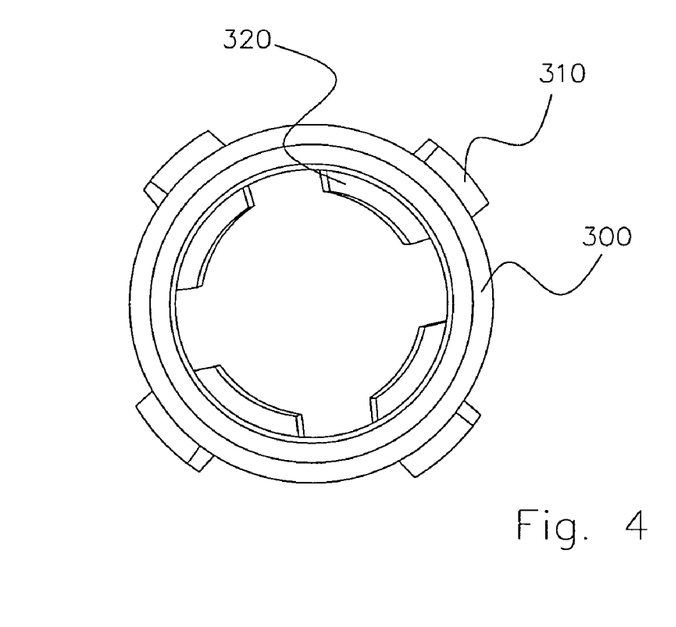
FIG. 4 shows the open container illustrated in FIG. 3 of the preferred embodiment of the door fixture of the invention in a front view.
Figure 5:
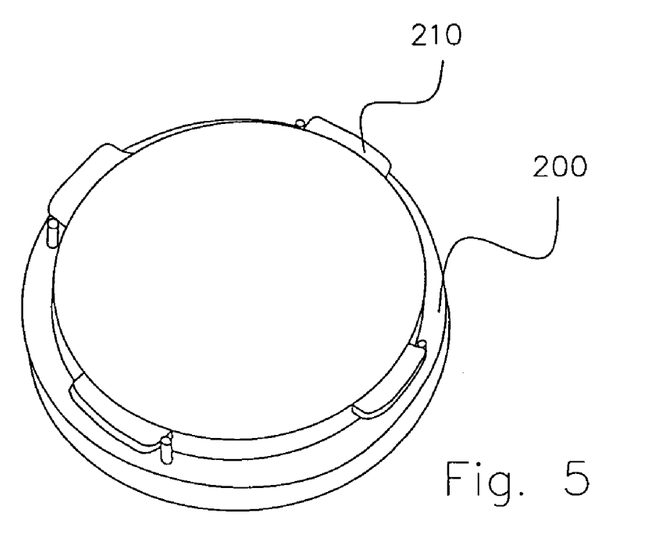
FIG. 5 shows a container closure unit of a door of the preferred embodiment of the door fixture of the invention in an oblique front view from the direction of the container.
Figure 6:
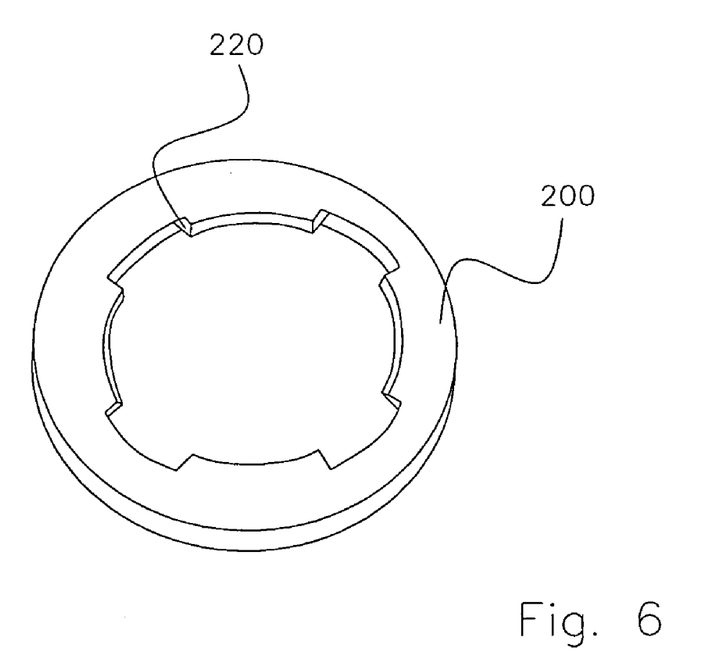
FIG. 6 shows the container closure unit illustrated in FIG. 5 of a door of the door fixture of the invention in an oblique front view from the direction of the isolator.
Figure 7:
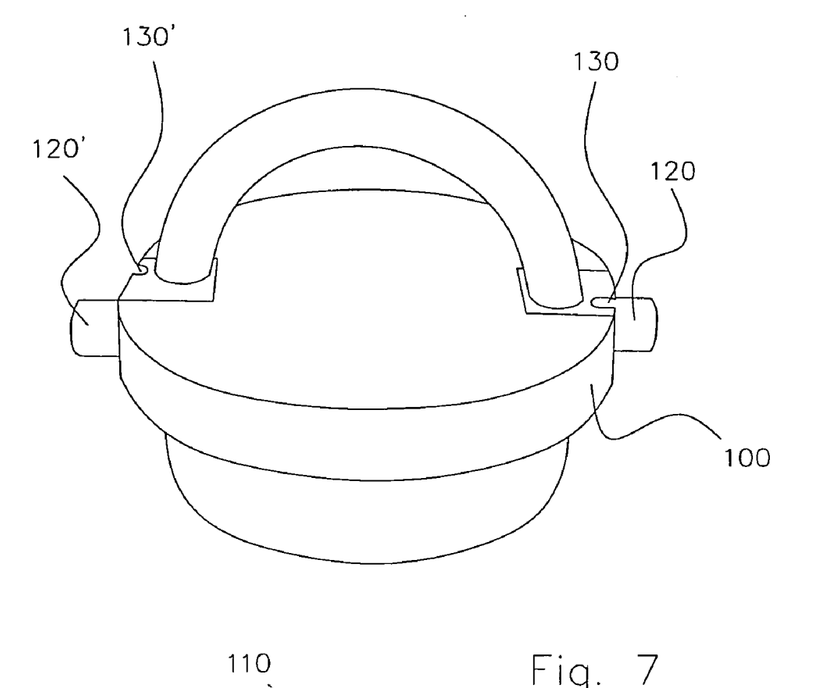
FIG. 7 shows a door of the preferred embodiment of the door fixture of the invention in an oblique front view from the direction of the isolator.
Figure 8:
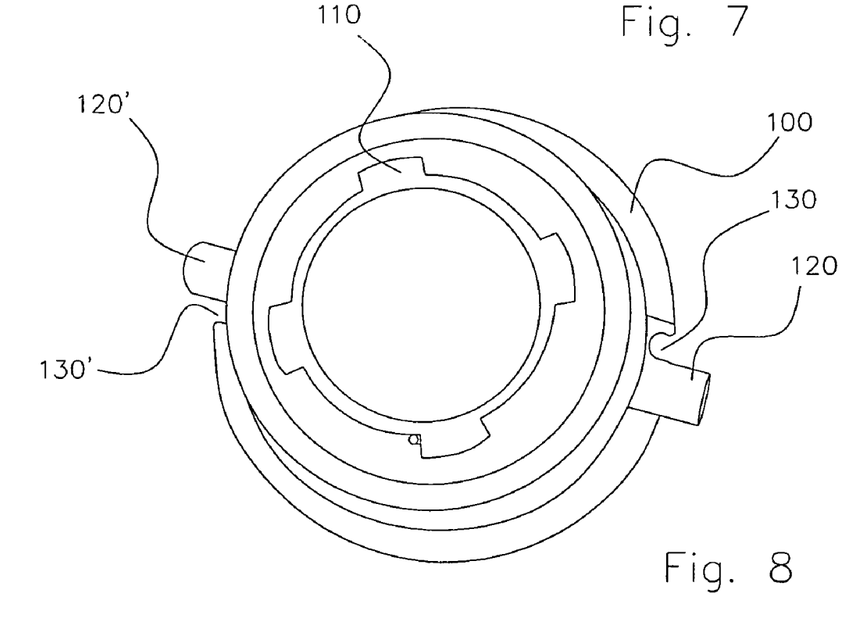
FIG. 8 shows the door illustrated in FIG. 7 of the door fixture of the invention in an oblique front view from the direction of the container.
Figure 9:
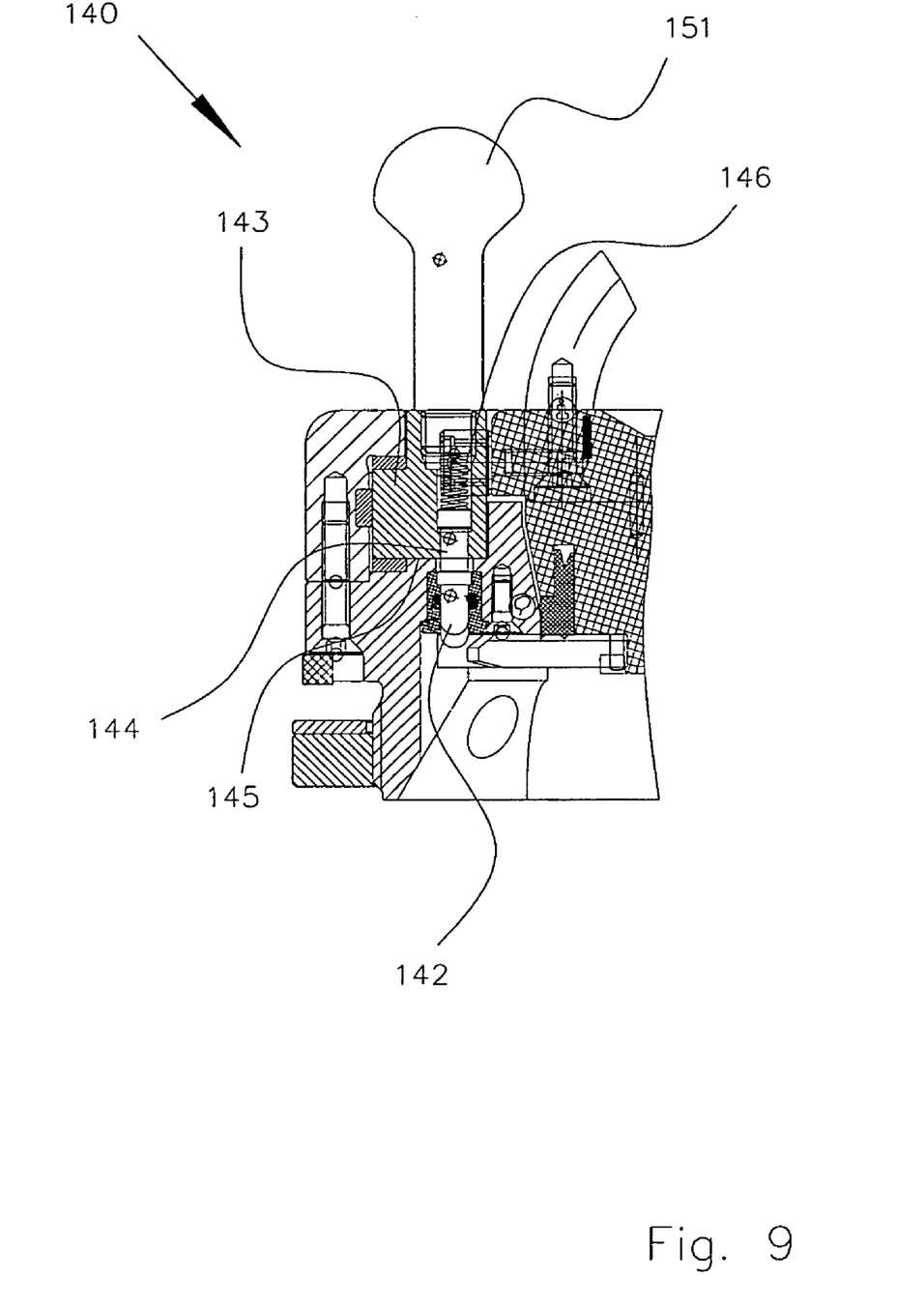
FIG. 9 shows a preferred embodiment of the door fixture of the invention in a cross-sectional view illustrating the function of the first safety device.

The first safety device 140 contains a first pin 142, which is mounted in the isolator frame in a reciprocally displaceable fashion, and which, when a container bayonet 31 of a container 300 is inserted into and turned in the isolator frame 410, moves from a biased home position toward the locking ring 143, thus abutting an engagement member 144 which is in a biased home position, said engagement member being entrainable by the pin to such an extent that said engagement member comes into alignment with a corresponding surface 145 of the locking ring 143 in order to release the ring for rotation within the frame 410 from a first end position, in which the isolator door 100 is shut tight, to the other end position, in which the isolator door 100 can be opened. The engagement member 144 is in the form of another pin, and a spring 146 is provided for biasing it. Prior to turning a container bayonet 310 of a container 300 into the isolator frame 410, the container 300 is shut tight by a closure unit 200 of a door 100, which closure unit 200 is anchored to an internal bayonet counter bearing 320 of the container 300.

Figure 10:
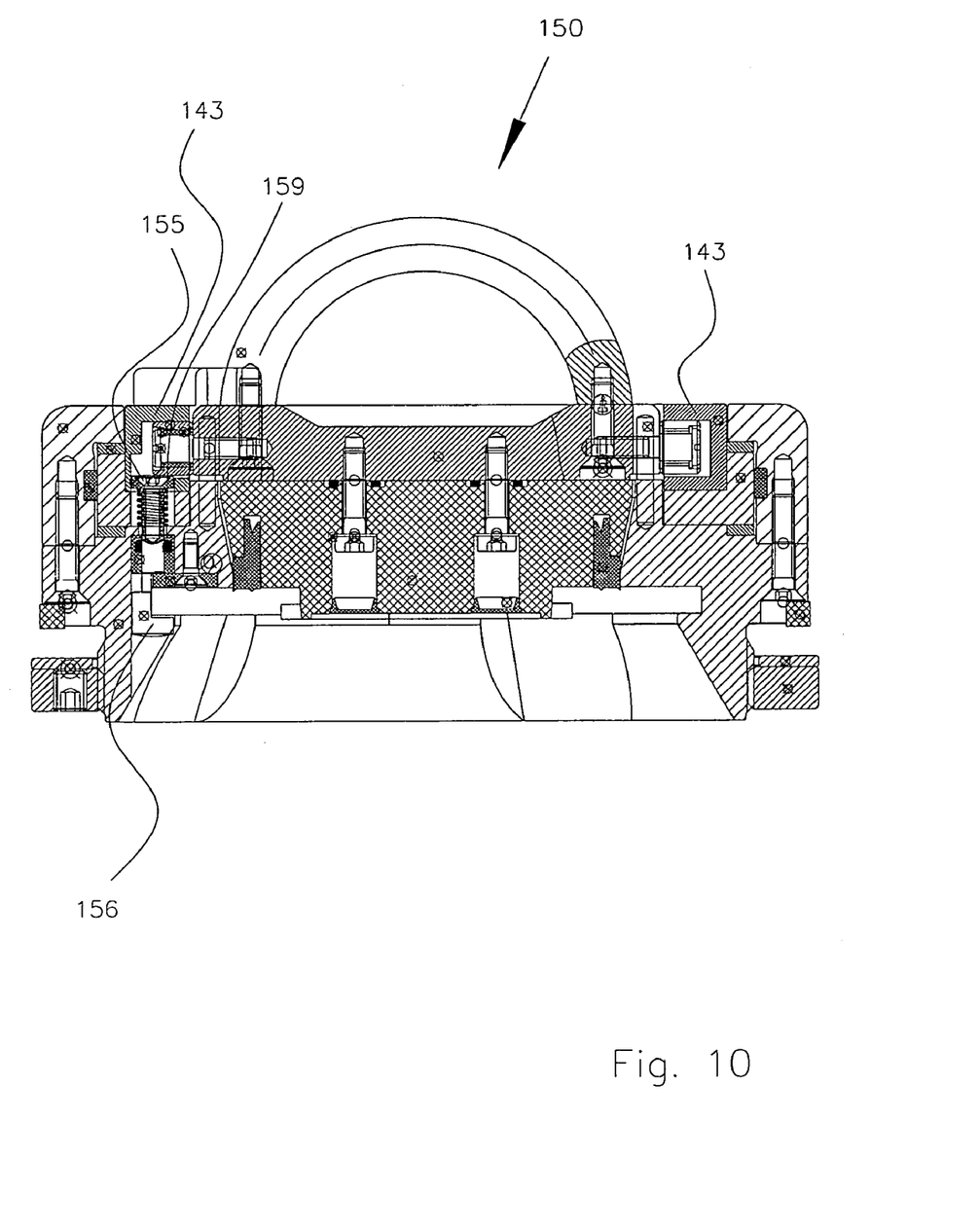
FIG. 10 shows a preferred embodiment of the door fixture of the invention in a cross-sectional view illustrating the function of the second safety device.

The second safety device 150 includes two curved and in part helical channels 148, 148' which are provided in the locking ring 143 and in whose opening 420 facing the isolator the door 100 can be inserted via its lateral rollers 120, 120', there being mounted a second pin 155 for reciprocal displacement in that surface of the channel 148 which is remote from the isolator, which pin abuts a reciprocally displaceable engagement member 156 and is biased such that the action of a roller 120, 120' of a door 100, caused by insertion of said roller into the curved channel 148 and rotation of the locking ring 143 so as to move said roller to its first end position, closing the door, and further forward up to an end face of the channel, will cause said pin to be moved from its biased home position 120, 120', in which the engagement member 156 catches in a recess in the container bayonet in order to lock the container bayonet 310 in position, into a displaced position in which the engagement member 156 releases the container bayonet 310 to enable it to be turned out and, later, turned back in.

By turning the locking ring 143 into its first end position, closing the door, the closure unit 200 anchored to an internal bayonet counter bearing 320 of the container 300 is detached from the container 300 and transferred to the door 100.

At least one arresting device is provided on the isolator frame 410 for interaction with the door 100, preventing it from rotating when the locking ring 143 is turned. An arresting device is in the form of a pin that catches in a corresponding recess in the region of the periphery of the door 100 of circular cross-section.

A door 100 is provided with two lateral rollers 120, 120' whose axes of rotation are aligned in the radial direction of the circular door 100. The second pin 155 is in the form of a screw. A helical spring 159 is provided for the purpose of biasing the second pin 155.

The exemplifying embodiment of the invention explained above serves merely to provide a better understanding of the teaching of the invention which is defined in the claims and is not, as such, restricted to said embodiment.

The invention claimed is:

1. A door fixture to be fastened to a frame of an isolator, comprising a door and a double bayonet closure comprising two bayonet locks, each bayonet lock having a form whose mirror image is not superimposable upon the form of the other bayonet lock for the purpose of reciprocally transferring said isolator from a first state, in which said door which opens from inside said isolator, is open and detached from said isolator frame and a container flange surrounding a container is sealingly locked to said isolator frame, and a second state, in which said door is shut and sealingly locked to said isolator frame and said container flange is detached from said isolator frame, there being provided a first safety device, which allows said door to be opened only when a container flange of a container is sealingly locked to said isolator frame, and a second safety device, which allows for the removal of said container flange from said isolator frame only when said door is sealingly locked to said isolator frame, wherein a locking ring that is rotatably mounted in said frame and can be releasably locked in position, in one end position of which the first safety device is activated and the second safety device is deactivated, and in the other end position of which the first safety device is deactivated and the second safety device is activated.

2. The fixture as defined in claim 1, wherein said locking ring is provided with a rotary handle.

3. The fixture as defined in claim 1, wherein said first safety device contains a first pin, which is mounted in said isolator frame in a reciprocally displaceable fashion, and which, when a container bayonet is inserted into and turned in said isolator frame, moves from a biased home position toward said locking ring, thus abutting an engagement member which is in a biased home position, said engagement member being entrainable by said pin to such an extent that said engagement member comes into alignment with said locking ring in order to release said ring for rotation within said isolator frame from one end position, in which said isolator door is shut tight, to the other end position, in which said isolator door can be opened.

4. The fixture as defined in claim 3, wherein said engagement member is in the form of another pin.

5. The fixture as defined in claim 3, wherein a helical spring is provided for biasing said engagement member.

6. The fixture as defined in claim 1, wherein said second safety device includes a curved and in part helical channel which is formed in said locking ring and in whose opening facing said isolator said door can be inserted via lateral rollers, there being mounted a second pin for reciprocal displacement in that surface of said channel which is remote from said isolator, which pin abuts a reciprocally displaceable engagement member and is biased such that the action of a roller of a door, caused by insertion of said roller into said curved channel and rotation of said locking ring so as to move said roller to its first end position, closing said door, and further forward up to an end face of said channel, will cause said pin to be moved from its biased home position, in which said engagement member catches in a recess in said container bayonet in order to lock said container bayonet in position, to a displaced position in which said engagement member releases said container bayonet to enable it to be turned out and, later, turned back in.

7. The fixture as defined in claim 6, wherein at least one arresting device is provided on said isolator frame for interaction with said door, which prevents said door from rotating when said locking ring is turned.

8. The fixture as defined in claim 7, wherein an arresting device is in the form of a pin that catches in a corresponding recess in region of the periphery of said door of circular cross-section.

9. The fixture as defined in claim 6, wherein a door is provided with two lateral rollers whose axes of rotation are aligned in the radial direction of said circular door.

10. The fixture as defined in claim 6, wherein said second pin is in the form of a screw.

11. The fixture as defined in claim 3, wherein a helical spring is provided for the purpose of biasing said second pin.

* * * * *